Figure 1:
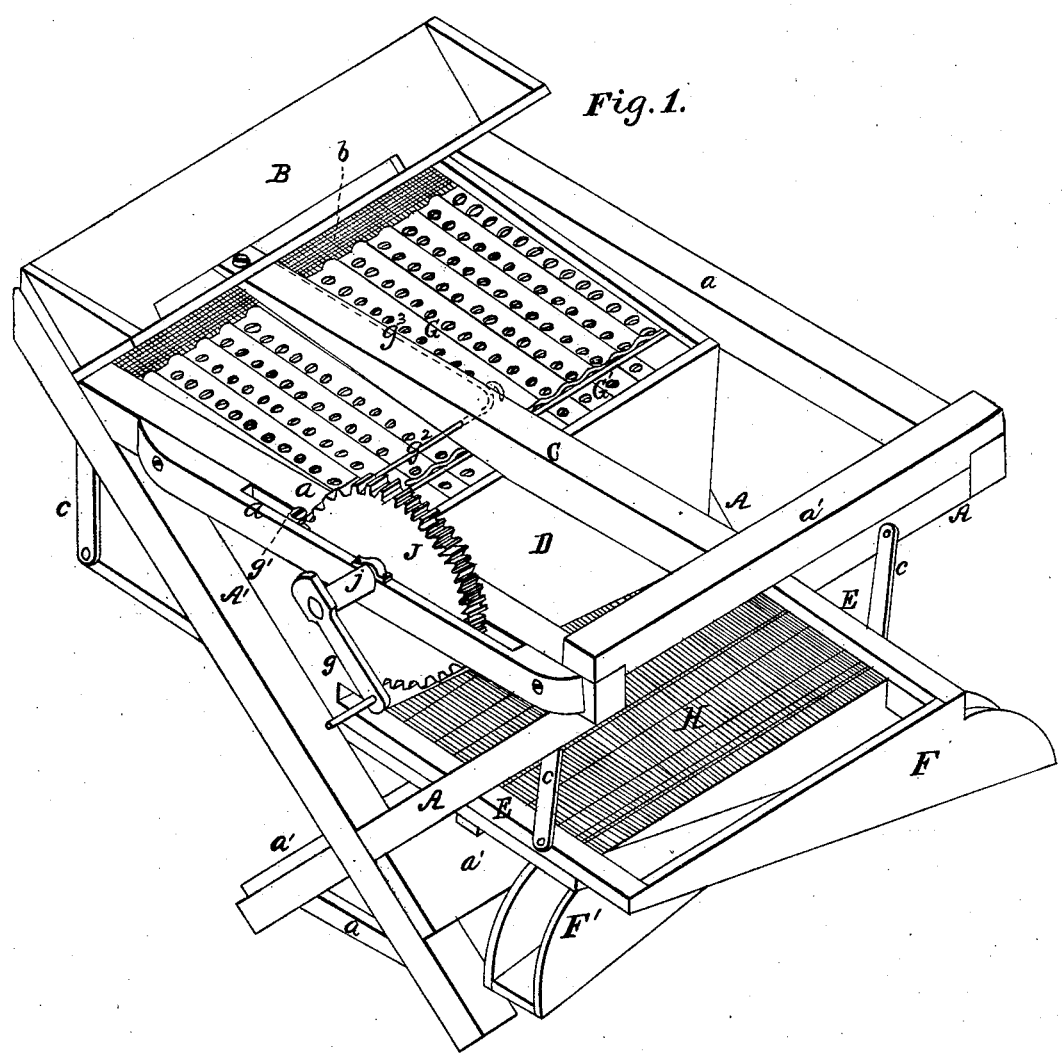

PARMATER & BOWEN.
Grain Separator.

2 Sheets—Sheet 1.

No. 89,334.

Patented April 27, 1869.

Witnesses:
John A Ellis
J. W. Meister

Inventors:
Parmater & Bowen
Per
J. H. Alexander
Atty

PARMATER & BOWEN.
Grain Separator.
2 Sheets—Sheet 2.
No. 89,334.
Patented April 27, 1869.
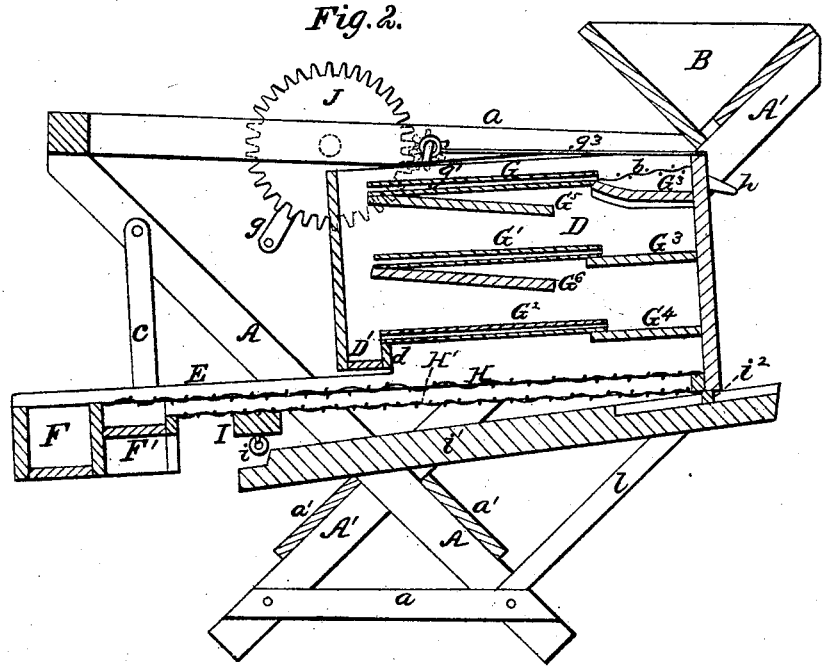

United States Patent Office.

J. C. PARMATER AND E. H. BOWEN, OF VINTON, IOWA.

*Letters Patent No. 89,334, dated April 27, 1869.*

IMPROVEMENT IN GRAIN-SEPARATORS.

The Schedule referred to in these Letters Patent and making part of the same.

*To all whom it may concern:*

Be it known that we, J. C. PARMATER and E. H. BOWEN, of Vinton, in the county of Benton, and State of Iowa, have invented certain new and useful Improvements in Grain-Separator, called the "Eureka Separator;" and we do hereby declare that the following is a full, clear, and exact description thereof, reference being had to the accompanying drawings, and to the letters of reference marked thereon, which form a part of this specification, and in which—

Figure 1 represents a perspective view of our grain-separator, and

Figure 2, a longitudinal central section of the same.

The nature of our invention consists in the employment in a grain-separating machine, of a series of zinc and wire screens, constructed, arranged, and operated in conjunction with certain other devices, to be hereinafter set forth.

To enable others to make and employ our invention, we will now describe it.

In the accompanying drawings—

A A' represent two standards, or bars, running diagonally across each other near their lower ends, and secured together by means of the upper and lower braces, or bars $a\ a$.

Placed a suitable distance apart from the standards A A', and connected therewith by cross-braces, or bars $a'\ a'$, are similar standards.

To the inner side of the upper ends of standards A A', is transversely secured a trough, B, or receptacle for grain, which is provided in its bottom with an oblong opening for the escape of grain therefrom.

C is a brace, secured at one end to the trough B, and fastened at its opposite end to cross-brace $a'$.

D represents a casing, or box, which is inclined at its lower front end, as seen in fig. 1, and provided thereat, on the inside of casing D, with a slant-board, partitioned off from the main part of the casing, by a piece, or board, $d$, thus forming a trough or spout, D', which is supplied at its lower end with an opening made in the said casing, the object of which will be seen hereafter.

This shoe, or casing is provided or formed at its lower front end with a frame, E, which is supplied on its lower side with two troughs F F', the trough F being inclined in one direction, and trough F' in the opposite direction.

G G$^1$ G$^2$ designate three fluted zinc screens, which are fastened at their inner ends to boards, or pieces G$^3$ G$^4$, fastened to the inner rear side of casing or shoe D.

The upper one of the boards G$^3$ is scooped out, or formed into a trough, which connects with the spout, or pipe, $h$, placed in the rear side of shoe or casing D.

$b$ is a small wire screen, secured across the trough, or board above described, to the screen G and shoe D.

G$^5$ G$^6$ are two boards, or planes, fastened at their front ends to the under side of the screens G G$^1$, and made to incline inwards, or in an opposite inclination to the screens above specified.

The casing, or shoe D is hinged or suspended from the standards A A, in an inclined position, by means of metal strips $c\ c$, for the purpose of giving it a reciprocating motion when operated.

H H' represent two wire screens, placed or secured in the lower part of the shoe D and frame E, the screen H being made to terminate in the spout, or trough F, and screen H' in the trough F'.

I is a cross-bar, or brace, secured to the lower side of frame E, and provided with a roller, or wheel, $i$, which plays back and forth on a rail, $i^1$, placed in an inclined position, and secured across the braces $a'\ a'$, attached to the lower ends of standards A A'.

The rear or upper end of the rail $i^1$ is provided with a groove, in which a guide or projection, $i^2$, on the rear end of casing D, slides or moves.

This rail is supported on each side of its rear end, by braces, or bars $l$, secured at their lower ends to braces $a\ a$ of standards A A'.

J is a cog-wheel, having its bearings on a shaft, $j$, held in place on one of the upper bars, or braces $a$, by suitable boxing, and supplied at its outer end with a crank-shaped handle, $g$.

$g^1$ is a pinion, into which the cog-wheel J gears, and which has for its bearing, a shaft, $g^2$, passing through brace C, and then formed into a hook to receive a corresponding eye on a right-angular rod, $g^3$, secured to the rear inner end of shoe, or casing D.

The operation of our invention is as follows:

The machine being put in motion, or a reciprocating motion given to the shoe, or casing D, the different kinds of grain will be thrust into the trough, or receptacle B, and pass through the opening in the bottom of said trough, and fall on the wire screen $b$, through which any fox-tail, or other fine seeds will pass, and empty into the trough directly below it, and be discharged through the spout, or pipe $h$.

The other grain will be caused to run down on the fluted screen G, the oats being discharged therefrom by the flutes of said screen, and fall into the trough D', and pass from the trough through its opening in casing D, while the wheat will be compelled to enter the oblong openings in said screen, and carried back on the inclined plane G$^5$, after which it will fall on a smooth board, G$^3$, and then be carried through a similar process, as above described, after which it will fall on another board G$^4$, and pass down through the openings of the screen G$^2$, and fall on a wire screen, H, which is of such a mesh as to permit any wild buckwheat, cockle, or cheat there may be in the wheat, to fall through said screen, and be wholly discharged from the shoe D, and the wheat thus refined, caused to empty into the spout, or trough F, by which it is discharged.

The finer quality of wheat that may have fallen through the screen H, will be caught on the screen H', from which it will be caused to empty into the spout F', and be thus conveyed from the machine.

What we claim, and desire to secure by Letters Patent, is—

1. The trough $G^3$, situated directly beneath the wire screen $b$, and supplied with the spout, or discharge-pipe $h$, passing through the upper rear end of shoe D, arranged and operated substantially as and for the purpose set forth.

2. The standards A A', connected as described, trough B, brace C, handle $g$, shaft $g^3$, cog-wheel J, pinion $g^1$, shaft $g^2$, connecting-rod $j$, shoe, or casing, D, screens G, $G^1$, $G^2$, and $b$, boards $G^3$ $G^3$ and $G^4$, spout $h$, wire screens H H', spout, or troughs F F', strips $c\ c$, roller $i$, guide or projection $i^2$, and rail $i^1$, all combined, arranged, and constructed substantially as and for the purpose set forth.

In testimony that we claim the foregoing as our own, we affix our signatures in presence of two witnesses.

J. C. PARMATER.
E. H. BOWEN.

Witnesses:
  F. C. VANETON,
  W. C. CONNELL.